March 22, 1960  P. O. BOBO  2,929,941
PHASE AND FREQUENCY MATCHING REGULATOR FOR GENERATORS
Filed June 15, 1956  3 Sheets-Sheet 2

March 22, 1960

P. O. BOBO 2,929,941

PHASE AND FREQUENCY MATCHING REGULATOR FOR GENERATORS

Filed June 15, 1956

United States Patent Office 2,929,941
Patented Mar. 22, 1960

2,929,941

PHASE AND FREQUENCY MATCHING REGULATOR FOR GENERATORS

Powell O. Bobo, Wilkinsburg, Pa., assignor to Westinghouse Electric Corporation, East Pittsburgh, Pa., a corporation of Pennsylvania Application June 15, 1956, Serial No. 591,686

8 Claims. (Cl. 307—87)

My invention relates generally to synchronizing apparatus, and it has reference in particular to a phase and frequency matching regulator for synchronizing alternating current machines and systems.

Generally stated, it is an object of my invention to provide for matching both the frequency and phase relationships occurring at the terminals of a synchronous machine with those of the system or power bus to which the machine is to be connected. A typical application would be that of controlling the speed (frequency) and phase (shaft position) of a direct current motor drive or other prime mover for a synchronous generator in paralleling the synchronous machine with another power source. The prime mover may also be a wound rotor induction motor having a liquid rheostat control, a steam turbine under governor control, or a water wheel under governor gate control, the liquid rheostat, governor, or governor gate being controlled by the regulator to effect frequency and phase matching. Besides matching both the frequency and phase of a machine for connection in parallel with a power source, the regulator can also be used for the general application of bringing the machine up to speed and then functioning to perform the final step of frequency and phase matching.

More specifically, it is an object of my invention to provide for producing signals proportional to both the frequency difference and the phase angle difference between the terminals of an alternating current machine and a bus to which it is to be connected, and for using such signals to control the machine to eliminate such differences and prepare the machine for synchronizing.

Another object of my invention is to provide for utilizing in series circuit relation signals which are individually proportional to the frequency error and the phase angle difference between the terminals of an alternating current machine and a bus to which it is to be connected, to bring the machine up to speed and then match the frequency and phase thereof.

Yet another object of my invention is to provide for regulating the prime mover of a synchronous generator in accordance with a signal that is jointly responsive to the phase angle difference and the frequency difference between the terminals of a synchronous generator and an alternating current circuit to which it is to be connected.

Other objects will in part be obvious, and will in part be explained hereinafter.

In practicing my invention in accordance with one of its embodiments, voltages are derived from the terminals of an alternating current generator and an alternating current bus to which it is to be connected, and are applied to pulse forming circuits. These pulse forming circuits are utilized to provide saw-tooth voltages which are averaged and then opposed to produce a differential voltage which varies with deviation of the machine frequency from the bus frequency. Voltages from the bus are also applied to the anodes of a pair of valves having grid voltages applied from the machine terminals so as to provide a differential output having an amplitude and polarity which change with lag or lead of the machine voltage relative to the bus voltage. These differential output voltages are then combined in series circuit relation and are utilized to control the prime mover of the synchronous generator so as to vary its speed and shaft position to match both its frequency and phase relation with those of the bus.

For a more complete understanding of the nature and scope of my invention, reference may be made to the following detailed description which may be read in connection with the accompanying drawings, in which.

Figure 1:
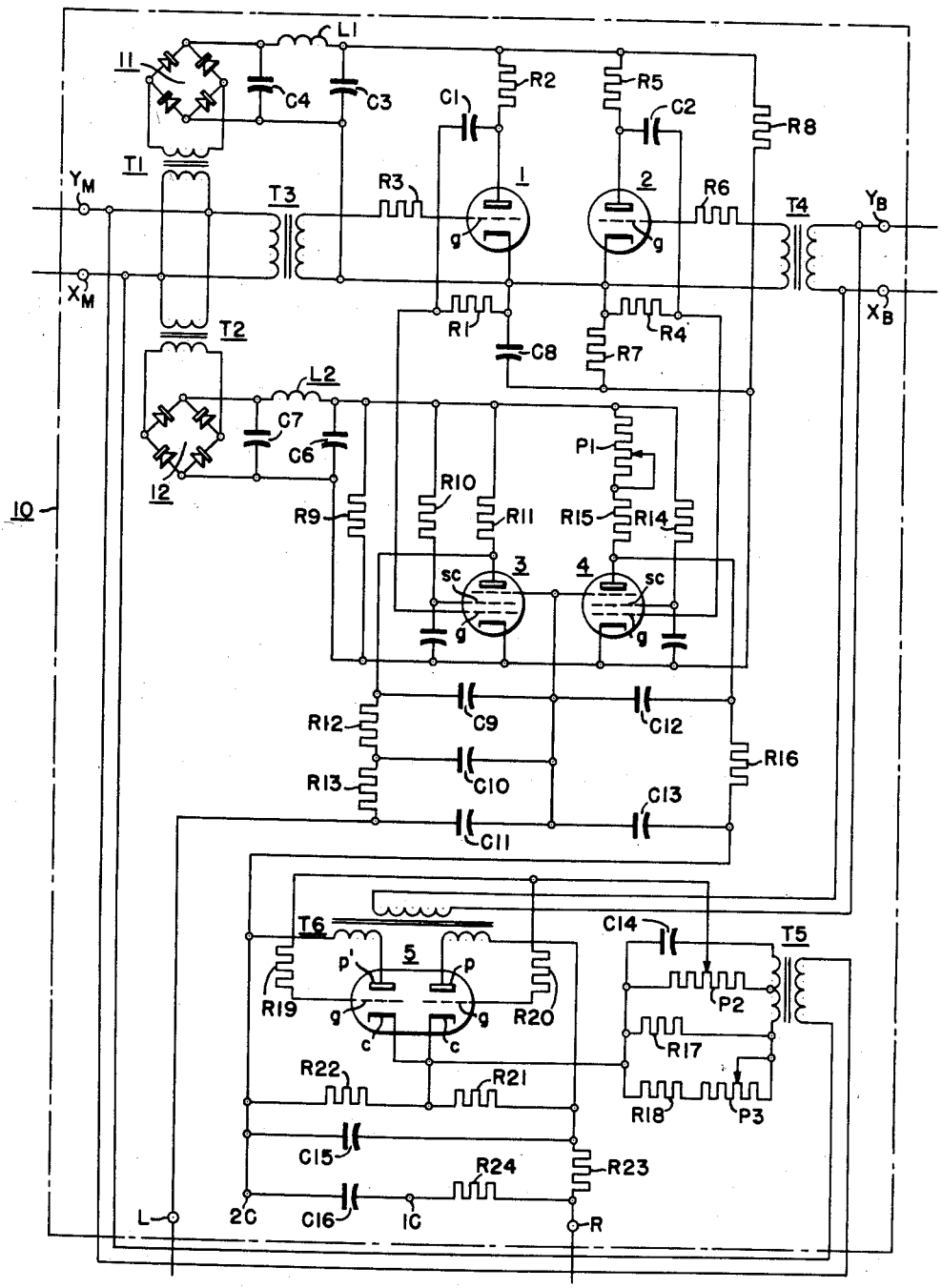
Figure 1 is a diagrammatic view of a phase and frequency matching regulator embodying the invention in one of its forms.

Referring particularly to Fig. 1, it will be seen that two direct current supplies are used to power separate pulse stages of a frequency matching network. A transformer T1 and a rectifier bridge circuit 11 in conjunction with a filter network C4, L1 and C3 furnish the direct current power to the first stage tubes #1 and #2 which may be of type 5692; resistors R8 and R7 create a bias voltage for the second stage tubes #3 and #4 which may be of type 6V6. Power for the second stage is derived from a transformer T2, a rectifier bridge circuit 12 and a filter network comprising capacitors C7, C6, inductance L2, and a resistor R9.

Transformers T3 and T4 apply the machine potential $(X_M-Y_M)$ and bus potential $(X_B-Y_B)$ respectively through resistors R6 and R3 to the grids $g$ of the tubes #2 and #1. R2 is the plate resistor for tube #1 and R5 is the plate resistor for tube #2. Capacitor C1 and resistor R1 comprise a pulse forming network connected between the plate $p$ of tube #1 and the control grid $g$ of tube #3. Likewise, capacitor C2 together with resistor R4 comprises a pulse forming network connected between the plate $p$ of tube #2 and the control grid $g$ of tube #4. The common bias voltage for both tubes #3 and #4 is obtained across resistor R7 and is filtered by capacitor C8.

A resistor R15 in series with a potentiometer P1, which provides for controlling the frequency balance, comprises the plate resistor of tube #4, while resistor R11 is the plate resistor of tube #3. Current limiting resistors R10 and R14 are connected in circuit with the screen grids $sc$ of the tubes #3 and #4, respectively. A capacitor C9 in conjunction with the resistor R11 functions with the tube #3 to produce a saw-tooth pulse voltage across capacitor C9. Likewise, capacitor C12 in conjunction with resistor R15 and potentiometer P1 functions with tube #4 to produce a saw-tooth pulse voltage across capacitor C12. The saw-tooth voltage of capacitor C9 is fed through a filter network comprising resistors R12 and R13 together with capacitors C10 and C11, where it appears as an average direct current value. Likewise, the saw-tooth pulse voltage across capacitor C12 is averaged through a filter network of resistor R16 and capacitor C13.

A direct current signal which is a function of the angular error between the bus and machine potentials is derived through a network associated with tube #5. Potential is derived from the bus ($X_B - Y_B$) through a transformer T6 and is connected in phase opposition between the plates $p$ and the cathodes $c$ of separate triode sections of tube #5 to produce voltages across load resistors R21 and R22. The grid voltage for both triode sections is derived from a transformer T5 connected to the machine terminals ($X_M - Y_M$) through a phase shifting network comprising a capacitor C14, a resistor R17, a resistor R18 and a potentiometer P3, which provides for phase balance control. The voltage to the grids $g$ of tube 5 may be varied in magnitude by means of a potentiometer P2 which provides for varying the phase sensitivity. The differential output from the different sections of tube #5 is filtered by a capacitor C15. Resistors R23 and R24 operate in conjunction with an external capacitor C16 to serve as a delay averaging network for the differential output voltage of tube #5.

Figure 3:
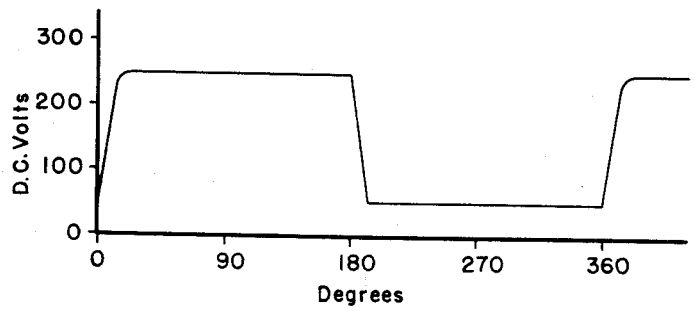
Fig. 3 illustrates the output voltage of the square wave generator in Fig. 1.
Figure 4:
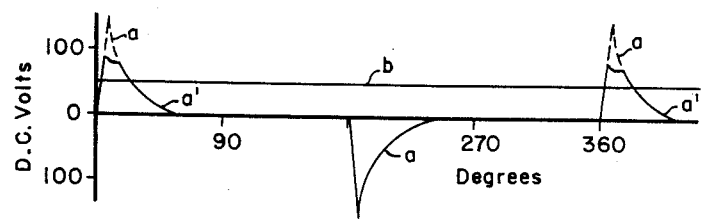
Fig. 4 shows the output of the pulse forming circuit of Fig. 1.

The machine and bus alternating current voltages acting through tubes #1 and #2, respectively, produce square wave voltages between their respective plates $p$ and cathodes $c$ similar to the curve shown in Fig. 3. The square wave voltages result from saturation of the tubes due to extremely high grid voltages, on the order of 230 volts, so that only very small portions of the applied sine wave voltages are effective to produce saturation. The square wave output voltages of tubes #1 and #2 acting through the RC networks R1—C1 and R4—C2 produce pulse type wave forms such as the curves $a$ illustrated in Fig. 4, each one having a positive pip and a negative pip per cycle across the resistors R1 and R4, respectively. The pulse voltage across R1 is applied to the grid $g$ of tube #3 in series with the bias voltage $b$ across resistor R7. Likewise, the voltage across resistor R4 is applied to the grid $g$ of tube 4 also in series with the bias voltage of R7 which is represented by the horizontal line $b$ in Fig. 4. The positive pulse pips overcome the negative bias sufficiently to result in positive pulses $a'$ which render the tubes 3 and 4, respectively, completely conducting with almost negligible impedance during the brief interval of pulse time. During the remaining portion of the cycle, the negative bias maintains the tubes #3 and #4 non-conducting, and the negative voltage pips acting in the same direction as the bias have no effect on the tubes.

Figure 5:
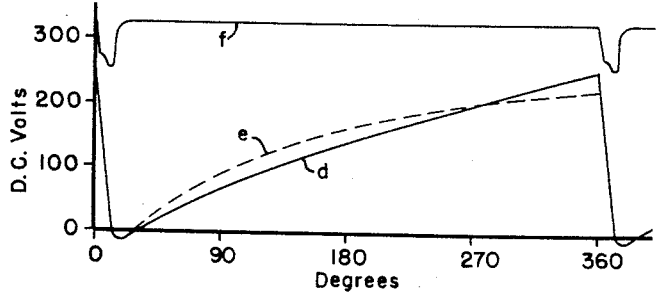
Fig. 5 illustrates the screen grid voltage and the output characteristic of either one of the saw-tooth generators of Fig. 1.

During the cycle interval in which tube #3 is cut off, capacitor C9 begins charging through R11 and approaches the voltage across resistor R9 of the power supply. The RC time constant of C9 and R11 is approximately .012 second, the time required for the voltage across C9 to reach 63% of the supply voltage. The curve in Fig. 5 shows that by the time the voltage across C9 builds up to approximately 240 volts, a positive pulse renders tube #3 highly conductive and very quickly discharges the voltage of capacitor C9. The time constant of the discharge circuit is short compared to the pulse interval, and permits full dissipation of the voltage on C9, an oscillograph picture showing even a small reversal of the voltage apparently due to inherent circuit inductance. The voltage built up and discharged across capacitors C9 is thus a saw-tooth wave form such as curve $d$ of Fig. 5 having a frequency identical to that of the alternating current bus voltage creating it and whose base time and voltage magnitude are both inversely proportional to that frequency. A like saw-tooth wave such as curve $e$ also shown in Fig. 5 is created across capacitor C12 through tube 4 by the pulses at machine frequency received from resistor R4. The volt-seconds of the pulses created across C9 and C12 are averaged through respective filter networks and appear across the capacitors C11 and C13, respectively.

Figure 6:
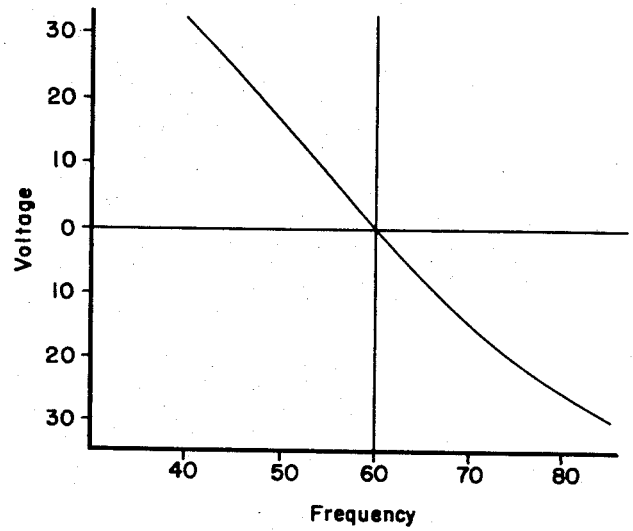
Fig. 6 shows the characteristic output curve of the frequency matching section of the regulator of Fig. 1.

It will be noted that the averaging networks for the saw-tooth waves of C9 and C12 are not alike. In order to obtain a high degree of accuracy, it is necessary to eliminate any beat action between the two averaged voltages created by the two saw-tooth waves. To do this with reasonable time delay, the saw-tooth wave produced from the bus voltage is averaged through a twin RC network comprising capacitors C10, C11 and resistors R12, R13 with a relatively long time delay compared to the single RC filter network of C13 and R16 for the saw-tooth wave produced by the machine voltage. This additional delay is permissible since the bus voltage serves as a reference and a negligible change of frequency may be expected. Near perfect filtering of the bus voltage saw-tooth wave operates to eliminate any beat frequency action, even though somewhat imperfect filtering may exist in the machine voltage. The final average voltages on the capacitors C11 and C13 are differentially combined, the capacitors being connected at their negative points to create a differential error voltage between terminals 2C and L which is directly proportional to the frequency difference between the machine and bus frequencies as shown in Fig. 6.

In order that the differential volt-seconds be more or less independent of the vacuum tube characteristics particularly for tubes #3 and #4, it is necessary that the charges created on capacitors C9 and C12 be completely discharged during the positive pulse intervals, otherwise the average volt-seconds may vary widely with tubes having different characteristics, resulting in cutoffs in positive voltage. It is the use of tubes #3 and #4 as tetrodes with a high screen grid voltage on the order of 325 volts that results in minimum tube impedance and permits complete discharge of capacitors C9 and C12. The small downward pip shown by the narrowing of the screen grid voltage pulse curve $f$ in Fig. 5 is indicative that the tube plate circuit has ceased conducting. The frequency matching error signal is substantially independent of variation in the supply voltage over a plus or minus 15% range either of the machine voltage or bus voltage or power supply voltage. This is because of the high gain used in tubes #1 and #2 for pulse forming and because of the differential connection of the respective machine and bus circuitry from common power supplies.

Figure 7:
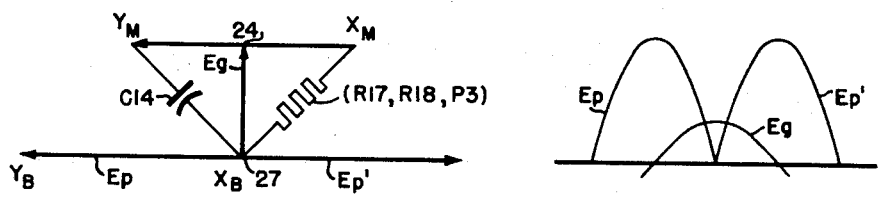
Fig. 7 is a vector diagram showing the relationships of the different voltages in the phase angle section of the regulator of Fig. 1.
Figure 8:
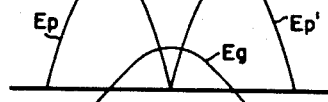
Fig. 8 illustrates the relationship of the plate and grid voltages in the phase angle section of the regulator.
Figure 9:
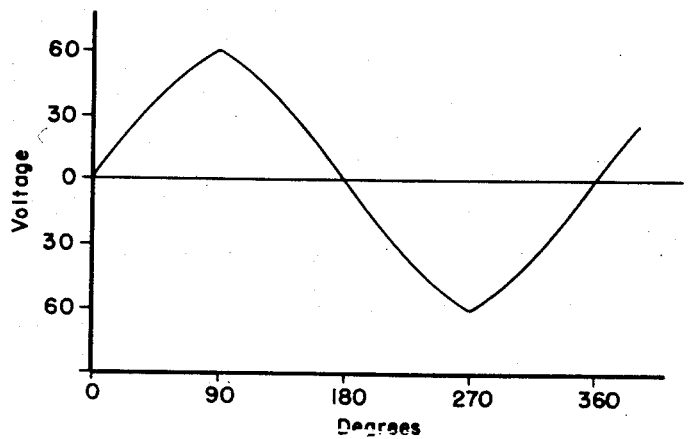
Fig. 9 shows the output characteristic of the phase angle section of the regulator of Fig. 1.

Fig. 7 shows a vector diagram of the machine and bus potentials, the phase shifting network associated with the machine potential and the relationship of voltages applied to the plates and grids of tube 5 all for balanced output conditions as matched frequency and phase relationship. It will be noted that the voltage between the common cathode lead 27 and lead 24 (or the voltage across P2) has a 90° relationship with the machine potential $X_M - Y_M$; and for in-phase conditions the relationship is also 90° with respect to the bus potential $X_B - Y_B$. A portion Eg of this voltage is taken from the potentiometer P2 through resistors R19 and R20 and applied to both grids $g$ of tube 5. The relationship of the plate and grid voltages is also shown by the curves E$p$, E$p$1 and Eg in Fig. 8. Under balanced conditions as shown, since the plate voltages E$p$ and E$p$1 are equal and opposite, the two sections of tube 5 have equal conduction and produce equal and opposite voltages across the load resistors R21 and R22, the common connection being positive. It is evident that for any angular position between 0° and 180° lag of the machine potential behind the bus potential an error signal with positive polarity is produced to advance the phase of the machine potential; similarly, for any angular position between 0° and 180° leading, an error signal of negative polarity is produced to retard the machine voltage. Fig. 9 shows a relationship between this error signal voltage and the angular lead and lag of the machine voltage with respect to the bus voltage. This voltage appears across the capacitor C15.

In coming up to speed, the potential of a machine to be synchronized must move through several slip cycles with respect to the bus potential before reaching the frequency of the bus. In so doing, the error signal of the phase matching section of the regulator reverses polarity once each slip cycle until the machine frequency equals that of the bus frequency.

As shown in Fig. 1, the output of the frequency matching section of the regulator which appears across terminals 2C—L acts in series with the output of the phase matching section of the regulator appearing at terminals R—2C to give a combined output between terminals R and L. In order to prevent severe oscillations in the combined output due to the polarity reversal of the phase matching section during the acceleration period of the machine, the output of this phase matching section is fed through a long time constant averaging circuit comprising resistors R23 and R24 in conjunction with a capacitor C16 connected between terminals 1C and 2C. The effect of this averaging circuit is to give the frequency matching section of a regular control during the accelerating period of the machine. During acceleration, the frequency matching signal gradually diminishes and becomes zero at synchronous speed leaving only the error signal of the phase matching section present at the output terminals R and L.

The polarity of the error signal output from terminals R and L is as follows. Terminal R is positive with respect to terminal L for machine speeds below synchronous speed and phase positions between 0° and 180° lagging; and terminal R is negative with respect to terminal L for machine speeds in excess of synchronous speed and phase positions between 0° and 180° leading.

Figure 2:
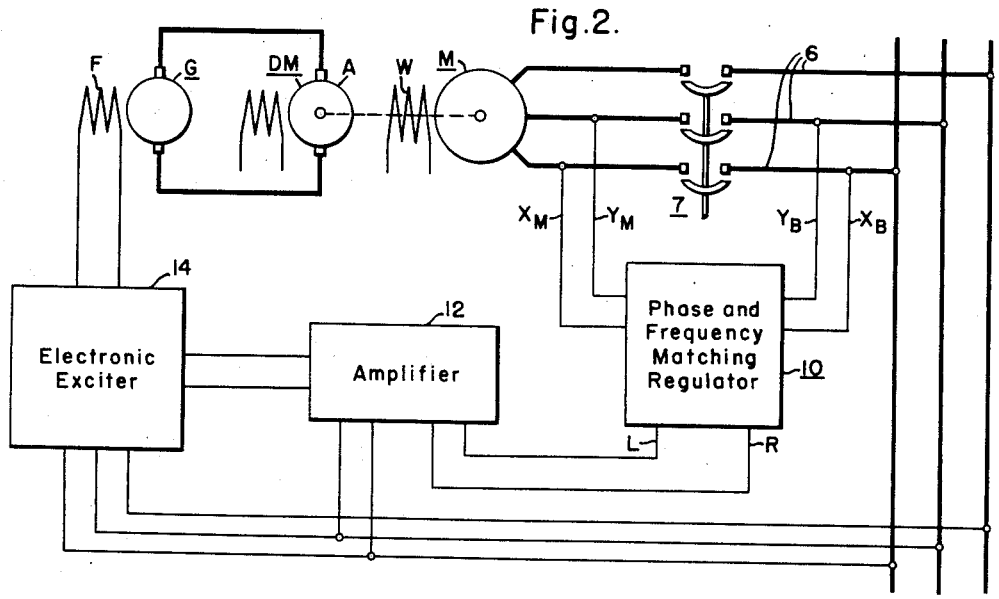
Fig. 2 is a schematic diagram of control apparatus showing one application of the invention in synchronizing a synchronous motor with an alternating current bus.

Referring to Fig. 2 it will be seen that the phase and frequency matching regulator 10 is connected both to the terminals of a synchronous motor M, which may form part of a wind tunnel drive, and to the bus conductors 6 to which the motor is to be connected by a circuit breaker 7. The regulator 10 is connected through a suitable amplifier 12 and an electronic exciter 14 of any suitable type for controlling the excitation of the field winding F of a direct current generator G which is connected to supply direct current to the armature a of a direct current motor DM connected in driving relation with the rotor of the synchronous motor M. The field winding W of the synchronous motor may be energized from any suitable source. The regulator 10 is thus connected to supply a control voltage from terminals L and R which is utilized to control the excitation of the generator G and vary the speed of the driving motor DM to cause the synchronous motor M to accelerate to synchronous speed and have its phase position matched with that of the bus conductor 6 to which the motor M is to be synchronized. After the motor M has been brought into a condition of synchronism, actual closing of the circuit breaker 7 may be effected either manually or by means of suitable verifying equipment of a type well known in the art.

From the above description and the accompanying drawings, it will be apparent that I have provided in a simple and effective manner for completely regulating the operation of a synchronous machine for synchronizing purposes. Both frequency difference and phase angle difference signals are utilized not only to finally match the frequency and phase angle of the machine with that of the bus, but also for the general application of bringing the machine up to speed in order to perform the frequency and phase matching functions. A regulator embodying the features of my invention has a high degree of accuracy and is extremely reliable in operation, being affected only a minimum amount by variations in machine voltage source or power supply voltage.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. A regulator comprising, pulsing means operable to produce pulses at rates proportional to the frequencies of a pair of alternating current circuits, means producing voltages proportional to said pulse rates, means producing a voltage in accordance with a variation in phase angle between said circuits, and circuit means connecting the pulse rate voltages in opposed relation and in series circuit relation with the phase angle voltage.

2. In a regulator, a square wave generator operable in accordance with the frequency of each of two alternating current circuits, a pulse generator operated by each square wave generator, circuit means connecting the pulse generators to average the outputs thereof and produce a voltage differential in accordance with a difference in frequency of the circuits, phase responsive means producing a voltage varying with a difference in phase angle between said circuits, and means jointly responsive to said phase responsive voltage and said frequency difference voltage.

3. In a regulator, a pair of pulse forming circuits, a square wave generator connected to energize each of said circuits, means including a potential transformer connecting the square wave generators to separate alternating current circuits to produce substantially square waves with a frequency equal that of the circuit to which it is connected, means producing a saw-tooth potential in response to the pulses from said circuits, circuit means averaging said saw-tooth voltages and connecting them in opposition to produce a differential voltage, means producing a differential voltage varying with the phase angle between the said separate alternating current circuits, and circuit means connecting said differential voltages in series circuit relation.

4. In a regulator for a pair of alternating current circuits one of which has a variable frequency, a pair of pulse forming circuits, electrode-controlled valve means connected to energize said pulse circuits, said valve means having control electrodes, means connecting the control electrodes each to a different one of said circuits to effect operation of said valve means at a high degree of saturation, a pair of capacitors, a charging circuit individual to each capacitor, a tetrode valve having a high screen grid voltage connected to discharge each capacitor, circuit means connecting each pulse circuit to apply a voltage therefrom to a different one of said tetrode valves, circuit means including an RC filter network connected to average the output voltages of the tetrode valves, the RC network of the tetrode controlled by the pulse circuit energized from the alternating current circuit in the said pair of circuits other than the variable frequency one having a relatively long time delay compared to the other RC network to eliminate any beat frequency action, said RC networks being connected with their output voltages in opposition to produce a differential therebetween, means producing a voltage differential in response to a difference in phase angle between the alternating current circuits, and circuit means connecting said differential voltages in series to produce a frequency and phase angle difference signal.

5. A phase and frequency matching regulator for regulating an alternating current machine for synchronizing it with an alternating current source comprising, a pair of pulse forming circuits, a square wave generator connected to energize each pulse forming circuit, one of said generators producing a square wave in accordance with the frequency of the machine and the other in accordance with the frequency of the source, a saw-tooth generator operated by each pulse forming circuit, circuit means separately averaging the saw-tooth outputs and combining them in opposed relation to produce a differential direct current voltage proportional to a frequency differential between the machine and source, valve means each having a load circuit and a control electrode, circuit means applying voltage from the source to the load circuits in opposed phase relation, and phase balance means applying voltages to the control electrodes in the same phase relation but intermediate the phase relations of the load circuits to produce a differential output in accordance with the difference in phase angle of the source and machine, and circuit means connecting the phase and frequency voltage in series circuit relation.

6. The combination with a synchronous motor which is to be connected to an alternating current bus, of means driving the synchronous motor, means including a phase and frequency matching regulator operable to produce a variable voltage comprising serially related voltages dependent on frequency and phase angle differences between the motor and the bus, and means varying the speed of the driving means in response to said variable voltage.

7. In combination, a synchronous machine, means operable to connect the machine to an alternating current bus, a direct current motor connected in driving relation with the synchronous motor, a generator having an armature connected to supply electrical energy to the direct current motor and having a field winding, excitation means connected to supply excitation to the field winding, a phase and frequency matching regulator connected to the alternating current bus and to the synchronous machine to produce serially related output voltages proportional to the frequency difference and the phase angle error between the machine and the bus, and circuit means connecting the regulator and the excitation means to effect energization of the field winding in accordance with the serially related output voltages.

8. A regulator comprising, means producing a voltage proportional to the frequency difference between two alternating current circuits, means producing a voltage varying as a function of the phase angle difference between the circuits, and means including a long time constant averaging circuit connecting the phase angle difference voltage in circuit with the frequency difference voltage to permit the frequency difference voltage to predominate initially.

References Cited in the file of this patent
UNITED STATES PATENTS

| | | |
|---|---|---|
| Re. 16,966 | Traver | May 15, 1928 |
| 2,076,588 | Pearson | Apr. 13, 1937 |
| 2,817,023 | Rice | Dec. 17, 1957 |
| 2,817,024 | Karlicek | Dec. 17, 1957 |
| 2,830,195 | Buechler | Apr. 8, 1958 |